United States Patent
Sundararajan et al.

(10) Patent No.: US 7,249,010 B1
(45) Date of Patent: Jul. 24, 2007

(54) METHODS OF ESTIMATING SUSCEPTIBILITY TO SINGLE EVENT UPSETS FOR A DESIGN IMPLEMENTED IN AN FPGA

(75) Inventors: Prasanna Sundararajan, Los Gatos, CA (US); Carl H. Carmichael, San Jose, CA (US); Scott P. McMillan, Santa Clara, CA (US); Brandon J. Blodget, Santa Clara, CA (US); Cameron D. Patterson, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 713 days.

(21) Appl. No.: 10/407,280

(22) Filed: Apr. 3, 2003

(51) Int. Cl.
  *G06F 9/44* (2006.01)
  *G06F 13/10* (2006.01)
  *G06F 13/12* (2006.01)
  *G06F 13/00* (2006.01)
  *G06F 17/50* (2006.01)
  *G06F 9/00* (2006.01)
  *G01R 31/08* (2006.01)
  *G01F 19/00* (2006.01)
  *G06F 11/34* (2006.01)
  *G06F 15/00* (2006.01)
  *G21C 17/00* (2006.01)
  *H03K 17/693* (2006.01)
  *H03K 17/687* (2006.01)

(52) U.S. Cl. ............... 703/21; 702/58; 702/59; 702/185; 716/16

(58) Field of Classification Search ......... 702/58, 702/59, 185; 716/16; 703/21
See application file for complete search history.

(56) References Cited

U.S. PATENT DOCUMENTS

| 5,850,145 | A | * | 12/1998 | Burroughs et al. | .......... 324/751 |
| 6,986,078 | B2 | * | 1/2006 | Rodbell et al. | ............... 714/10 |
| 7,036,059 | B1 | * | 4/2006 | Carmichael et al. | ........ 714/725 |

OTHER PUBLICATIONS

Hang T. Nguyen, "A Systematic Approach to Processor SER Estimation and Solutions", Oct. 6, 2002, Intel Corp., 26 pgs.*

(Continued)

*Primary Examiner*—Kamini Shah
*Assistant Examiner*—Suzanne Lo
(74) *Attorney, Agent, or Firm*—Lois D. Cartier

(57) ABSTRACT

Methods of estimating the susceptibility to single event upsets (SEUs) of a design implemented in an FPGA. In an FPGA, many of the configuration memory cells could change state in response to an SEU without affecting the functionality of a design implemented in the FPGA. According to the methods of the invention, the number of "care bits" (bits associated with resources actually used in the design) is determined. The number of care bits as a proportion of the total number of configuration memory cells in the FPGA determines the "SEU Probability Impact" (SEUPI) value. The "Mean Time Between Upsets" (MTBU) value is an estimate of how much time will elapse, on average, before one of the configuration memory cells in the FPGA is affected by an SEU. To obtain the "Mean Time Between Failures" for the design implemented in the FPGA, the MTBU value is divided by the SEUPI value.

21 Claims, 3 Drawing Sheets

OTHER PUBLICATIONS

Carmichael et al. "Correcting Single-Event Upsets Through Virtex Partial Configuration", Jun. 1, 2000, Xilinx, Inc. 12 pgs.*

Meggyesi et al., "FPGA Design in the Presence of Single Event Upsets", Oct. 1, 1999, 4 pgs.*

A.M. Finn, "System Effects of Single Event Upsets", Computers in Aerospace VII Conference, Oct. 3-5, 1999, AIAA, pp. 994-1002.*

Wirthlin et al. "The Effects of Upsets within the Configuration Memory of SRAM FPGAs" 2002, 21 pgs.*

Eric Johnson et al.; "Single-Event Upset Simulation on an FPGA"; LA-UR-02-2907; Engineering of Reconfigurable Systems and Algorithms (ERSA); Jun. 24-27, 2002; 6 pages.

* cited by examiner

METHODS OF ESTIMATING SUSCEPTIBILITY TO SINGLE EVENT UPSETS FOR A DESIGN IMPLEMENTED IN AN FPGA

FIELD OF THE INVENTION

The invention relates to field programmable gate arrays (FPGAs) subject to single event upsets (SEUs). More particularly, the invention relates to methods of estimating the susceptibility to SEUs of a design implemented in an FPGA.

BACKGROUND OF THE INVENTION

Programmable logic devices (PLDs) are a well-known type of digital integrated circuit that can be programmed to perform specified logic functions. One type of PLD, the field programmable gate array (FPGA), typically includes an array of configurable logic blocks (CLBS) surrounded by a ring of programmable input/output blocks (IOBs). Some FPGAs also include additional logic blocks with special purposes (e.g., DLLs, RAM, and so forth).

FPGA logic blocks typically include programmable logic elements such as lookup tables (LUTs), memory elements, multiplexers, and so forth. The LUTs are typically implemented as RAM arrays in which values are stored during configuration (i.e., programming) of the FPGA. The flip-flops, multiplexers, and other components are also programmed by writing configuration data to configuration memory cells included in the logic block. For example, the configuration data bits can enable or disable elements, alter the aspect ratios of memory arrays, select latch or flip-flop functionality for a memory element, and so forth. The configuration data bits can also interconnect the logic elements in various ways within a logic block by programming select values for multiplexers inserted in the interconnect paths within the logic block.

The various logic blocks are interconnected by a programmable interconnect structure that includes a large number of programmable interconnect lines (e.g., metal wires). The interconnect lines and logic blocks are interconnected using programmable interconnect points (PIPs). For example, a PIP can be implemented as a CMOS pass-gate. When the passgate is turned on (i.e., the PIP is enabled), the two interconnect lines on either side of the passgate are electrically connected. When the passgate is turned off (i.e., the PIP is disabled), the two interconnect lines are isolated from each other. Thus, by controlling the values on the gate terminals of the PIPs, circuit connections can be easily made and altered. The value controlling each PIP is also stored in a configuration memory cell.

In FPGAs, configuration memory cells are typically implemented as static RAM (random access memory) cells. Each FPGA typically contains many thousands or even millions of these static RAM configuration memory cells.

When bombarded by high-energy particles, a static RAM cell can change state. For example, a stored high value can be inadvertently changed to a low value, and vice versa. These inadvertent and undesired state changes are known as "single event upsets", or SEUs. Sometimes an SEU has no effect on the functionality of the design. At other times, an SEU can change the function of an FPGA such that the circuit implemented in the FPGA no longer functions properly.

For example, if a static RAM cell controlling a PIP changes state, but the two interconnect lines on either side of the PIP are not used in the design, this change of state has no effect on the function of the circuit. Similarly, a change of state in a memory cell in an unused LUT has no effect. However, when SEUs occur in portions of the FPGA that are in use, they can result in loss of function for the entire system that includes the FPGA.

In some applications, such as space-based applications in a low-earth orbit, it is important to minimize the effects of SEUs in FPGA-based designs. SEUs can also be a concern in some earth-based systems, e.g., systems in high altitude locations. One method of mitigating and minimizing these effects is "triple modular redundancy", or TMR, in which three copies of a circuit are included in a design. Any two copies of the circuit can override output from the third copy, if it generates data different from the other copies. While useful in many applications, implementing a circuit using TMR requires about three times as many FPGA resources as a standard implementation. Therefore, when TMR is impractical, it is desirable to provide methods of measuring or estimating the susceptibility to SEUs of a design implemented in an FPGA. Using SEU susceptibility estimates, FPGA designers can judiciously trade off FPGA resources for reliability when implementing mitigation strategies.

In the absence of an accurate method of estimating the susceptibility of an FPGA design to SEUs, designers often resort to the worst case scenario and assume that an SEU at any configuration memory cell will interfere with the functionality of the design. However, this approach results in a susceptibility estimate that is much too high. As described above, some SEUs have no effect on the functionality of the design. Therefore, methods have been sought to produce more accurate estimates of SEU susceptibility, tailored to specific designs. Thus, one method of estimating the effects of SEUs is to test each FPGA design for susceptibility to SEUs. Further, based on the results of these tests, design strategies can be developed that inherently reduce the susceptibility of designs to SEUs.

Currently-known methods of performing such tests use an SEU insertion testbed to simulate the effects of an SEU on the design under test. The testbed is a board that includes two FPGAs and additional circuitry for comparing output data from the two FPGAs. Each FPGA is configured with the design under test. The configuration data of one of the FPGAs is then deliberately corrupted to simulate the effects of an SEU, by performing a partial reconfiguration and altering (for example) a single configuration bit of the operating design under test. The output data from the two FPGAs is then compared to determine the effects of the simulated SEU.

A disadvantage of this method is that simulating an SEU for each configuration memory cell in an FPGA is not an inconsequential task. For example, in an FPGA having five million configuration bits, testing the results of toggling each bit, one at a time, can be a lengthy process. Considering that this process might need to be performed for many different designs, as the design is modified in an attempt to reduce its susceptibility to SEUs, the process can be undesirably cumbersome. If fewer than all of the five million configuration bits are tested, the results of the test might be skewed. For example, the set of bits tested might include a higher or lower proportion of configuration bits that have no effect on the design functionality than the entire design taken as a whole.

Another disadvantage of this method is that the hardware necessary to perform the simulation testing can be expensive.

An alternative method currently in use is to subject the FPGA, programmed with the design under test, to high energy radiation that can cause SEUS. The high energy radiation can be produced, for example, by high energy particle generators in a lab environment. Conducting these experiments can be time-consuming and costly, as there are only a few facilities available that are capable of performing the experiments.

Therefore, it is desirable to provide simpler and faster methods of estimating the susceptibility to SEUs of a design implemented in an FPGA.

SUMMARY OF THE INVENTION

The invention provides methods of estimating the susceptibility to single event upsets (SEUs) of a design implemented in an FPGA. The methods of the invention take advantage of the fact that in an FPGA, many of the configuration memory cells could change state in response to an SEU without affecting the functionality of a design implemented in the FPGA. According to the methods of the invention, the number of resources actually used in the design is determined, and the number of configuration memory cells associated with those resources is obtained. This is the number of "care bits" for the design. The number of care bits as a proportion of the total number of configuration memory cells in the FPGA determines the "SEU Probability Impact" (SEUPI) value. Clearly, the SEUPI value is specific to a particular design implemented in a particular FPGA.

Another useful value is the "Mean Time Between Upset" (MTBU) value, which is an estimate of how much time will elapse, on average, before one of the configuration memory cells in the FPGA is affected by an SEU. The MTBU value is specific to the FPGA, but is the same for all designs. To obtain the "Mean Time Between Failures" (MTBF) for the design implemented in the FPGA, the MTBU value is divided by the SEUPI value. The MTBU value is different from the MTBF, because not all SEUs cause a functional failure in the design.

According to a first embodiment of the invention, a method of estimating the susceptibility to SEUs of a design implemented in an FPGA includes: determining resources of the FPGA used in the design; selecting a first one of the resources used in the design; determining a number of configuration bits associated with the first resource; and setting a number of care bits to the number of configuration bits associated with the first resource. For each additional resource used in the design, the following series of steps are then carried out: selecting another one of the resources used in the design; determining a number of configuration bits associated with the selected resource; setting a number of resource bits to the number of configuration bits associated with the selected resource; and setting the number of care bits to the previous number of care bits plus the number of resource bits. At this point in the process, the number of care bits includes all of the care bits for the entire design. An SEU Probability Impact (SEUPI) value is then set to the number of care bits divided by the total number of configuration memory cells in the FPGA.

Optionally, the method continues with the step of estimating a mean time between failures (MTBF) based on the SEUPI value. In some embodiments, estimating the MTBF includes the steps of: determining an area cross-section susceptible to SEUs for one configuration bit of the FPGA; determining a neutron flux in a target location; calculating a Mean Time Between Upsets (MTBU) value for the FPGA based on the area cross-section (ACS), the neutron flux (NF), and the total number of configuration memory cells in the FPGA (TCMC); and calculating the estimated MTBF based on the MTBU value and the SEUPI value. In some embodiments, the MTBU value for the FPGA equals $\{1/(ASC*NF*TCMC)\}$. In some embodiments, the estimated MTBF is calculated by dividing the MTBU value by the SEUPI value.

Additional aspects of the invention include computer-executable code and computer systems for performing the steps of the methods described above.

According to another aspect of the invention, a computer-readable storage medium includes computer-executable code for estimating the susceptibility to SEUs of a design implemented in an FPGA. The medium includes a design file comprising the design implemented in the FPGA, a resource identification tool for determining resources of the FPGA used in the design, and a resource usage list comprising a list of resources from the FPGA identified by the resource identification tool as being used in the design. The resource usage list can be compiled, for example, by using the design file and the resource identification tool. The medium also includes a device resource and configuration bits model identifying a number of configuration bits associated with each resource in the FPGA.

Also included in the computer-readable storage medium is an SEU Probability Impact (SEUPI) calculator for calculating a SEUPI value for the design in the FPGA. The SEUPI calculator, for example, can calculate the SEUPI value using the resource usage list and the total number of configuration bits in the FPGA, as provided in a computer file or calculated based on the FPGA architecture and size.

Where desired, the susceptibility of the design to SEUs can be expressed as an MTBF, as described above. This value can be provided by including an MTBF calculator in the computer-readable storage medium.

BRIEF DESCRIPTION OF THE DRAWINGS

The present invention is illustrated by way of example, and not by way of limitation, in the following figures.

DETAILED DESCRIPTION OF THE DRAWINGS

In the following description, specific details are set forth to provide a more thorough understanding of the present invention. However, it will be apparent to one skilled in the art that the present invention can be practiced without these specific details.

Figure 1:
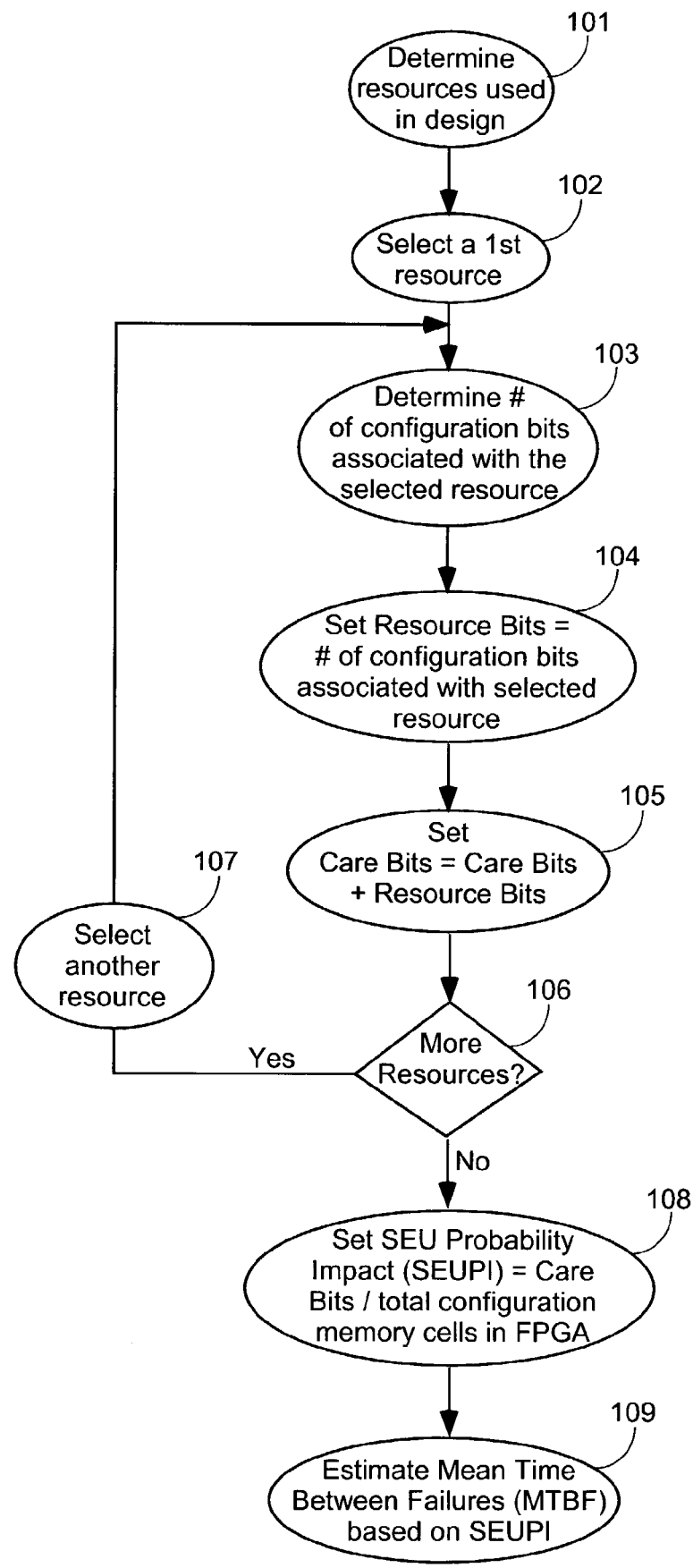
FIG. 1 illustrates the steps of a method of estimating the susceptibility to single event upsets (SEUs) of a design implemented in an FPGA, according to an embodiment of the invention.

FIG. 1 illustrates the steps of a method of estimating the susceptibility to SEUs of a design implemented in an FPGA, according to an embodiment of the invention. In step 101, the FPGA resources used in the design are determined. For example, the resources used can be determined by parsing the design file, which contains a complete description of the design as implemented in the FPGA.

In step 102, a first resource is selected from the resources determined in step 101. In step 103, the number of configuration bits associated with the selected resource is determined. For example, this information can be obtained by accessing a value provided in a computer file, e.g., by looking up the resource in a device resources and configuration bits model file. In some embodiments, the number of configuration bits associated with the selected resource is determined using the software that generates the final configuration bit stream for the FPGA design. For example, the bit stream generation software can be designed to provide both a bit stream for a design and a listing of resources and their associated care bits.

In step 104, a number of "resource bits" is set to the number of configuration bits determined in step 103. "Care bits" are configuration bits that will adversely affect the functionality of the design if affected by an SEU. The number of "resource bits" is the number of configuration bits associated with the selected resource. In step 105, the number of care bits is set to a previous value (initially zero) plus the number of resource bits determined in step 104.

In step 106, if additional used resources remain, another of the resources is selected (step 107), and steps 103-106 are repeated. After performing steps 103-105 for all used resources, the number of care bits is equal to the total number of resource bits for each used resource.

In step 108, the SEU Probability Impact (SEUPI) value is calculated. The SEUPI value is obtained by dividing the number of care bits by the total number of configuration memory cells in the FPGA. The total number of configuration memory cells in the FPGA can be obtained, for example, by accessing a value provided by a computer operator or a computer file, or by calculating a value based on the FPGA architecture and size. The SEUPI value represents the percentage of the total configuration memory cells in the FPGA that will adversely affect the functionality of the design if affected by an SEU. Note that the SEUPI value is specific to the design and to the FPGA in which the design is implemented.

In optional step 109, the Mean Time Between Failures (MTBF) is calculated, based on the SEUPI value from step 108. In some embodiments, the MTBF is estimated by following the series of steps illustrated in FIG. 2. In the exemplary process of FIG. 2, a MTBU value is first obtained, and the MTBF is then calculated based on the MTBU value and the SEUPI value.

In step 201, an area cross-section is determined, e.g., by accessing a value provided by a computer operator or a computer file. The area cross-section (ACS) represents a per-bit area of the FPGA that is susceptible to SEUs. Assuming that each configuration memory cell in the FPGA follows the same design and layout, the ACS is the same for each configuration memory cell in the FPGA. The value can be obtained, for example, by calculation or by direct measurement of the silicon surface. For one FPGA, the ACS value is 1.56E-14 $cm^2$/bit, or 1.56 times 10 to the −14th power, in units of square centimeters per bit. For this exemplary FPGA, this measured ACS value can actually be used for all FPGAs within the same family of FPGAs, because the configuration memory cells of each member of the FPGA family follow the same design and layout.

In step 202, the neutron flux is determined, e.g., by accessing a value provided by a computer operator or a computer file. In this example, it is assumed that neutrons are the most significant source of SEUs. Therefore, the higher the neutron flux, the more likely is the occurrence of an SEU. For example, an FPGA in a low-earth orbit will have a higher neutron flux, and therefore will be more susceptible to SEUS, than the same FPGA operating on the surface of the earth. The FPGA on the earth's surface is protected from neutron flux to some extent by the earth's atmosphere. For example, at sea level and 45 degrees latitude, the neutron flux can be estimated to be about 120 neutrons/($cm^2$-hr), or 120 neutrons per square centimeter per hour.

Steps 201 and 202 can be performed in any order, or simultaneously.

In step 203, a MTBU value for the FPGA is calculated based on the area cross-section (ACS) determined in step 201, the neutron flux (NF) determined in step 202, and the total number of configuration memory cells in the FPGA (TCMC). The TCMC can be obtained, for example, by accessing a value provided by a computer operator or a computer file. In some embodiments, the MTBU value is $\{1/(ASC*NF*TCMC)\}$, or the inverse of the product of ASC, NF, and TCMC. Thus, the units of the MTBU value are time divided by neutrons, or time per SEU. In other words, the MTBU value is an estimate of how much time will elapse, on average, before one of the configuration memory cells in the FPGA is affected by an SEU. Note that the MTBU value is specific to the FPGA, but is the same for all designs.

The MTBU value in the pictured embodiment depends on the product of ACS and NF, while neither of the values is used without the other. Therefore, in some embodiments (not shown), steps 201 and 202 are replaced by a single step in which the value of (ACS*NF) is obtained. In other embodiments (also not shown), steps 201 and 202 are replaced by a single step in which the value of (ACS*NF*TCMC) is obtained. In yet other embodiments, because the MTBU value is specific to the FPGA, the MTBU value is itself simply available from the computer operator or provided in a computer file.

In step 204, the Mean Time Between Failures (MTBF) is estimated by dividing the MTBU value by the SEUPI value. In other words, the MTBF is the time before one of the configuration memory cells in the FPGA is affected by an SEU, divided by the likelihood that the affected SEU will have an adverse effect on the functionality of the design. In effect, the MTBF is the MTBU value modified to account for the fact that only a subset of the configuration memory cells on the FPGA are actually used in the design.

Note that the MTBF obtained using the methods illustrated and described herein is an estimate, not an exact value. To obtain an exact value, other methods can provide more accurate results, e.g., sequentially simulating an SEU for each configuration memory cell in an FPGA configured with the design, as described in the Background section, above. However, simulating several million SEUs can be a time-consuming task. Hence, the methods of the invention can provide a much faster and simpler estimate of design susceptibility to SEUs.

Note also that when the exemplary methods described above are applied to designs incorporating triple modular redundancy (TMR), the effects of the TMR implementation are not taken into account. According to some embodiments of the invention, the illustrated methods are modified to assign a "don't care" value to all configuration bits corresponding to circuitry included within the triply-redundant module.

Figure 2:
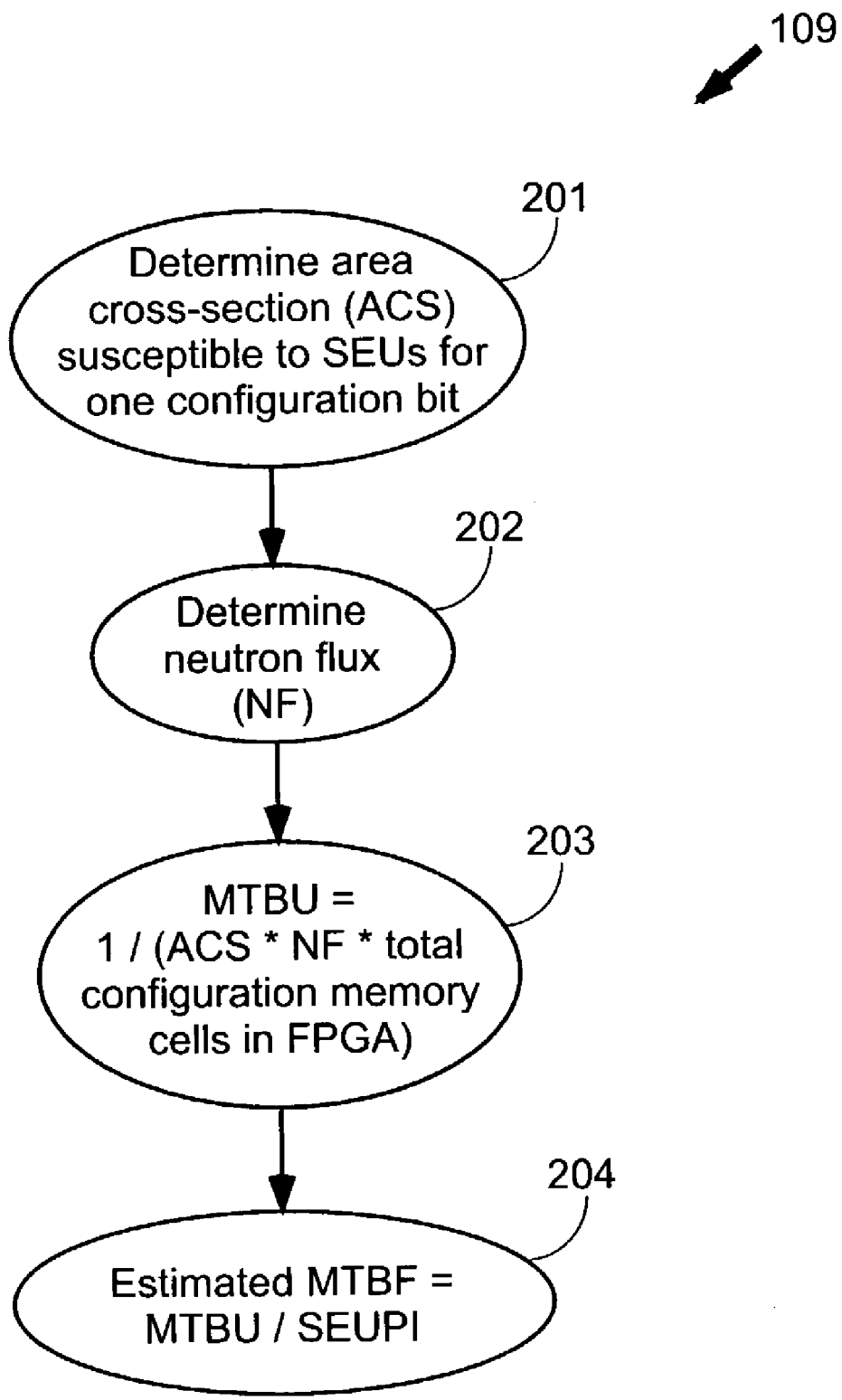
FIG. 2 illustrates the steps of a method of estimating a Mean Time Between Failures (MTBF) that can be used with the method of FIG. 1, according to an embodiment of the invention.
Figure 3:
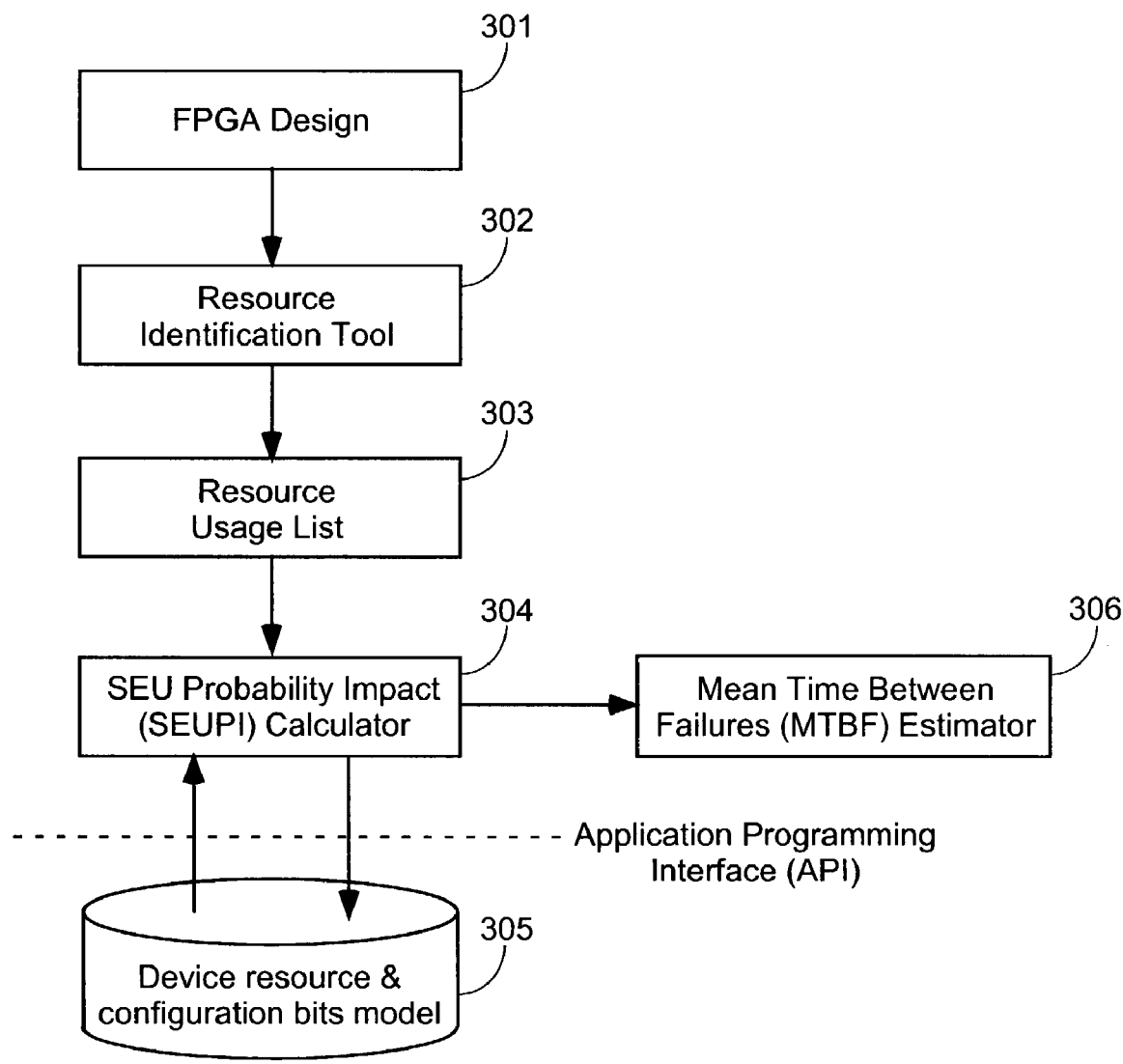
FIG. 3 is a conceptual illustration of a set of elements stored on a computer-readable storage medium and designed to facilitate the estimation of a SEU Probability Impact (SEUPI) value and MTBF for a design implemented in an FPGA, according to another embodiment of the invention.

FIG. 3 is a conceptual illustration of a set of elements stored on a computer-readable storage medium that can be used to implement the steps of the methods shown in FIGS. 1 and 2, according to another embodiment of the invention.

Element 301 is a design implemented in an FPGA, e.g., supplied by the computer operator. Element 302 is a resource identification tool. Resource identification tool 302 can be included, for example, with the FPGA implementation software, or can be supplied only to users who have a need to estimate the susceptibility of their designs to SEUs. Resource identification tool 302 can be used, for example, to perform step 101 in FIG. 1. Resource identification tool 302 calls on FPGA design 301 and generates Resource Usage List 303.

Element 304 is an SEU Probability Impact (SEUPI) calculator. SEUPI calculator 304 accesses Resource Usage List 303 to select each used resource in turn (steps 102, 106, and 107 of FIG. 1). SEUPI calculator 304 also obtains needed information from Device resources and configuration bits model 305.

For example, in the illustrated embodiment SEUPI calculator 304 accesses Device resources and configuration bits model 305 to determine the number of configuration bits associated with each selected resource (step 103 in FIG. 1). In some embodiments, SEUPI calculator 304 also accesses Device resources and configuration bits model 305 to determine the total number of configuration memory cells in the FPGA (used in step 108 in FIG. 1). Where element 305 is provided with the FPGA implementation software, an Application Programming Interface (API) can also be provided, providing a means for data access by the SEUPI calculator.

Element 306 is a Mean Time Between Failures (MTBF) estimator. Where an MTBF value is desired, MTBF estimator 306 uses the SEUPI value provided by SEUPI calculator 304 to generate the MTBF value (step 109 in FIG. 1). In some embodiments, MTBF estimator 306 performs steps 201-204 as shown in FIG. 2.

The methods of the present invention can be performed in either hardware, software, or any combination thereof, as those terms are currently known in the art. In particular, the present methods can be carried out by software, firmware, or microcode operating on a computer or computers of any type. Additionally, software embodying the present invention can comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Further, such software can also be in the form of a computer data signal embodied in a carrier wave, such as that found within the well-known Web pages transferred among computers connected to the Internet. Accordingly, the present invention is not limited to any particular platform.

Those having skill in the relevant arts of the invention will now perceive various modifications and additions that can be made as a result of the disclosure herein. Accordingly, all such modifications and additions are deemed to be within the scope of the invention, which is to be limited only by the appended claims and their equivalents.

What is claimed is:

1. A method of estimating the susceptibility to single event upsets (SEUs) of a design implemented in a field programmable gate array (FPGA), the method comprising:
    determining resources of the FPGA used in the design;
    selecting a first one of the resources used in the design;
    determining a number of configuration bits associated with the first resource;
    setting a number of care bits to the number of configuration bits associated with the first resource;
    repeating, for each additional resource used in the design, the steps of:
        selecting another one of the resources used in the design,
        determining a number of configuration bits associated with the selected resource,
        setting a number of resource bits to the number of configuration bits associated with the selected resource, and
        setting the number of care bits to the previous number of care bits plus the number of resource bits;
    setting an SEU Probability Impact (SEUPI) value to the number of care bits divided by a total number of configuration memory cells in the FPGA; and
    outputting the SEUPI value as an estimated SEU susceptibility for the design implemented in the FPGA.

2. The method of claim 1, wherein setting the number of care bits to the number of configuration bits associated with the first resource comprises:
    setting the number of resource bits to the number of configuration bits associated with the first resource, and
    setting the number of care bits to the number of resource bits.

3. The method of claim 1, further comprising:
    estimating a mean time between failures (MTBF) based on the SEUPI value.

4. The method of claim 3, wherein estimating the MTBF based on the SEUPI value comprises:
    determining an area cross-section susceptible to SEUs for one configuration bit of the FPGA;
    determining a neutron flux in a target location;
    calculating a mean time between upsets (MTBU) value for the FPGA based on the area cross-section (ACS), the neutron flux (NF), and the total number of configuration memory cells in the FPGA (TCMC); and
    calculating an estimated MTBF based on the MTBU value and the SEUPI value.

5. The method of claim 4, wherein calculating the estimated MTBF for the FPGA comprises calculating the MTBU value divided by the SEUPI value.

6. The method of claim 4, wherein calculating the MTBU value for the FPGA comprises calculating a value of $\{1/(ASC*NF*TCMC)\}$.

7. The method of claim 6, wherein calculating the estimated MTBF for the FPGA comprises calculating the MTBU value divided by the SEUPI value.

8. An article of manufacture, comprising:
    a computer-readable storage medium comprising computer-executable code for estimating the susceptibility to single event upsets (SEUs) of a design implemented in a field programmable gate array (FPGA), the medium comprising:
    code for determining resources of the FPGA used in the design;
    code for selecting one of the resources used in the design;
    code for determining a number of configuration bits associated with the selected resource;
    code for setting a number of resource bits to the number of configuration bits associated with the selected resource;
    code for setting the number of care bits to a previous number of care bits plus the number of resource bits;
    code for executing, for each resource used in the design, the code for selecting one of the resources used in the design, the code for determining the number of configuration bits, the code for setting the number of resource bits, and the code for setting the number of care bits; and code for setting an SEU Probability Impact (SEUPI) value to the number of care bits divided by a total number of configuration memory cells in the FPGA.

9. The article of manufacture of claim 8, further comprising:
code for estimating a mean time between failures (MTBF) based on the SEUPI value.

10. The article of manufacture of claim 9, wherein the code for estimating the MTBF based on the SEUPI value comprises:
code for determining an area cross-section susceptible to SEUs for one configuration bit of the FPGA;
code for determining a neutron flux in a target location;
code for calculating a mean time between upsets (MTBU) value for the FPGA based on the area cross-section (ACS), the neutron flux (NF), and the total number of configuration memory cells in the FPGA (TCMC); and
code for calculating an estimated MTBF based on the MTBU value and the SEUPI value.

11. The article of manufacture of claim 10, wherein the code for calculating the estimated MTBF for the FPGA comprises code for calculating the MTBU value divided by the SEUPI value.

12. The article of manufacture of claim 10, wherein the code for calculating the MTBU value for the FPGA comprises code for calculating a value of {1/(ASC*NF*TCMC)}.

13. The article of manufacture of claim 12, wherein the code for calculating the estimated MTBF for the FPGA comprises code for calculating the MTBU value divided by the SEUPI value.

14. A computer system for estimating the susceptibility to single event upsets (SEUs) of a design implemented in a field programmable gate array (FPGA), the system comprising:
a resource determining module for determining resources of the FPGA used in the design;
a resource selecting module for selecting one of the resources used in the design;
a configuration bit determining module for determining a number of configuration bits associated with the selected resource;
a resource bit setting module for setting a number of resource bits to the number of configuration bits associated with the selected resource;
a care bit setting module for setting the number of care bits to a previous number of care bits plus the number of resource bits;
a code executing module for executing, for each resource used in the design, the resource selecting module, the configuration bit determining module, the resource bit setting module, and the care bit setting module;
an SEU Probability Impact (SEUPI) value setting module for setting the SEUPI value to the number of care bits divided by a total number of configuration memory cells in the FPGA; and
an output module for outputting the SEUPI value as an estimated SEU susceptibility for the design implemented in the FPGA,
wherein the resource determining module, the resource selecting module, the configuration bit determining module, the resource bit setting module, the care bit setting module, the code executing module, the SEUPI value setting module, and the output module comprise modules stored on the computer system.

15. The system of claim 14, further comprising:
a mean time between failures (MTBF) estimating module for estimating an MTBF based on the SEUPI value.

16. The system of claim 15, wherein the MTBF estimating module comprises:
a mean time between upsets (MTBU) calculating module for calculating a MTBU value for the FPGA based on an area cross-section (ACS) susceptible to SEUs for one configuration bit of the FPGA, a neutron flux (NF) for a target location, and the total number of configuration memory cells in the FPGA (TCMC); and
an MTBF calculating module for calculating an estimated MTBF based on the MTBU value and the SEUPI value.

17. The system of claim 16, wherein the MTBF calculating module comprises a module for calculating the MTBU value divided by the SEUPI value.

18. The system of claim 16, wherein the MTBU calculating module comprises a module for calculating a value of {1/(ASC*NF*TCMC)}.

19. The system of claim 18, wherein the MTBF calculating module comprises a module for calculating the MTBU value divided by the SEUPI value.

20. An article of manufacture, comprising:
a computer-readable storage medium comprising computer-executable code for estimating the susceptibility to single event upsets (SEUs) of a design implemented in a field programmable gate array (FPGA), the medium comprising:
a device resource and configuration bits model identifying a number of configuration bits associated with each resource in the FPGA;
a design file comprising the design implemented in the FPGA;
a resource identification tool for determining resources of the FPGA used in the design;
a resource usage list comprising a list of resources from the FPGA identified by the resource identification tool as being used in the design; and
an SEU Probability Impact (SEUPI) calculator for calculating a SEUPI value for the design in the FPGA.

21. The article of manufacture of claim 20, further comprising:
a mean time between failures (MTBF) estimator for estimating an MTBF for the design in the FPGA based on the SEUPI value.

* * * * *